(12) United States Patent
Würstlin

(10) Patent No.: US 6,409,497 B1
(45) Date of Patent: Jun. 25, 2002

(54) HOT RUNNER NOZZLE

(75) Inventor: Walter Würstlin, Bahlingen (DE)

(73) Assignee: Otto Manner Heisskanalsysteme GmbH & Co. KG, Bahlingen (DE)

( * ) Notice: Subject to any disclaimer, the term of this patent is extended or adjusted under 35 U.S.C. 154(b) by 0 days.

(21) Appl. No.: 09/686,379

(22) Filed: Oct. 11, 2000

(30) Foreign Application Priority Data

Oct. 18, 1999 (DE) .......................................... 199 50 273

(51) Int. Cl.⁷ .............................................. B26C 45/20
(52) U.S. Cl. ................................... 425/549; 264/328.15
(58) Field of Search ...................... 425/549; 264/328.15

(56) References Cited

U.S. PATENT DOCUMENTS 4,968,247 A    11/1990  Olson
5,411,392 A     5/1995  Von Buren
5,871,785 A  *  2/1999  Van Boekel ................. 425/549

FOREIGN PATENT DOCUMENTS

DE    3046471 A1    7/1982
DE    2295758       6/1996
DE    19514487 A1   6/1996

* cited by examiner

Primary Examiner—Tim Heitbrink
(74) Attorney, Agent, or Firm—Volpe and Koenig, P.C.

(57) ABSTRACT

A hot runner nozzle (1) for injection-molding forms has a nozzle body (2) with a throughput channel (3) connected to a nozzle exit (5) for melts. At least one jacket-heating unit (8) is located at the exterior perimeter of the nozzle body (2). This heating unit is enclosed at its exterior perimeter by a sleeve (10), which is flexible in the radial direction. The sleeve (10) is enclosed at its exterior perimeter by at least one circular lock (11) that rotates about its longitudinal axis (12) relative to the sleeve (10) between a released position and a clamped position. The facing surfaces of the sleeve (10) and the lock (11) each have a profile that deviates from that of a cylindrical shell located concentric to the longitudinal axis (12). The facing surface of at least one of these parts (10, 11) is at least in certain areas designed as a wedge lock surface (13) that has an abutting slant located in a plane orthogonal to the longitudinal axis (12), against which a seating area of the surface of the other part (11, 10) lies (FIG. 1).

11 Claims, 3 Drawing Sheets

HOT RUNNER NOZZLE

BACKGROUND

This invention pertains to a hot runner nozzle for injection-molding forms with a nozzle body having a throughput channel with a nozzle outlet opening for melts. On the outer perimeter of this nozzle is at least one jacket-heating unit to heat the nozzle body. The heating unit is enclosed at its outer perimeter by a sleeve, and the sleeve and the heating unit are flexible in the radial direction.

This type of hot runner nozzle is known from patent No. U.S. Pat. No. 5,411,392. It has a sleeve-shaped heating unit that has a continuous slit in the axial direction and whose inside lies adjacent to the outer perimeter of the nozzle body and encloses it. A sleeve that has a continuous slit in the axial direction and that is made of an elastic spring material encloses the heating unit. In its un-tensioned rest position, the sleeve has a smaller inside diameter than the outer diameter of the heating unit. In the operational position, the heating unit is pressed from the outside by a clamping force created by the restoration force of the elastic spring material of the sleeve. This clamping force presses the heating unit against the nozzle body. By pressing the heating unit against the nozzle body, a lower thermal resistivity, and thus a good thermal coupling between the heating unit and the nozzle body is attained. Also, the heating unit is fastened to the nozzle body. However, the known prior art hot runner nozzle has the disadvantage in that the clamping force of the slit retainer relaxes when it is heated. Also, due to the high temperatures occurring when heating the hot runner nozzle, the clamping force of the sleeve can relax after a long period of standing so that the nozzle body then is no longer sufficiently heated. It is also not beneficial that the sleeve has to be widened against the restoration force of its spring material when it is installed or removed from the heating unit using a suitable stretching device so that it can be pushed onto the heating unit or removed from it. The installation and removal of the hot runner nozzle as is required, for example for maintenance work on the heating unit, is thus relatively complicated.

From DE 30 46 471 A1, there is already known a hot runner nozzle of the type mentioned above that has a sleeve that is closed around the perimeter and has a somewhat smaller inner diameter than the outer diameter of the heating unit and that is pressed onto the heating unit. The heating unit has an electrical heating coil with a multitude of windings that are placed in a helical notch incorporated into the outer jacket of the nozzle body. In this way, the transfer of the heat generated by the heating unit to the nozzle body is improved. The hot runner nozzle has, however, the disadvantage in that the heating coil placed in the helical notch cannot be removed from the nozzle body in a practical manner. The contamination accumulated during operation of the hot runner nozzle between the sleeve and the nozzle body can thus not be removed, which reduces the lifespan of the hot runner nozzle accordingly.

From DE 195 14 487 A1, there is a hot runner nozzle of the above-mentioned type with a heating unit designed as a heating coil. Here, the heating coil is located on the inside of the sleeve and is welded to it. The inside diameter of the heating coil is somewhat larger than the outside diameter of the nozzle body. The sleeve has a threaded penetration in the radial direction in which a locking screw is located. With this locking screw, the sleeve can be fastened against the nozzle body. However, the disadvantage is that in the clamped position the heating coil located on the inside of the sleeve only sits against the side of the nozzle body opposite the locking screw, whereas a gap is formed between the nozzle body and the heating coil on the other side of the nozzle body. The heat generated by the heating coil is thus introduced to the nozzle body unevenly at its perimeter.

From U.S. Pat. No. 4,968,247, another hot runner nozzle of the above-mentioned type is known in which the sleeve is designed as a pipe strap with a sheet-metal strip extending around the perimeter of the heating unit. The opposite ends of this sheet-metal strip are connected to a stretching device that has an eccentric locking element located alongside the nozzle body that is used to fasten the sheet metal strip to the heating unit and thus to press the heating unit against the nozzle body. The stretching device also enables a largely even pressing of the heating unit against the nozzle body around the perimeter of the heating unit, but also has the disadvantage in that it requires a relatively large amount of space such that in the injection mold form, an open area must be provided for the stretching device. Due to the limited space relationship in the area of the injection molding form, this is frequently not possible, or is only possible at great expense. Also, the bending stiffness of the injection mold form parts is reduced due to the open space such that they can deform by bending due to the injection molding pressure.

SUMMARY

Therefore, the object is to create a hot runner nozzle of the type mentioned above that is designed compact, enables simple installation and has good thermal coupling between the heating unit and the nozzle body.

This object is met in that the sleeve is enclosed on its outer perimeter by at least one circular lock that can rotate about its longitudinal axis relative to the sleeve between a released position and a clamped position, that the surfaces of the sleeve and the lock that are facing one another each have a profile that deviates from that of a cylindrical shell that is concentric to this longitudinal axis, and that at least one of these surfaces facing one another is designed in areas as a wedge lock surface that has an abutting slant in the clamped position in a plane orthogonal to the longitudinal axis, the surface of the other part lying in this plane with a seating area.

Thus, the lock can be rotated in a simple manner about its longitudinal centerline from the released into the clamped position relative to the retainer, and can be locked to this retainer. Here, when the lock is in the clamped position it can be released from the retainer by rotating it in the reverse direction again and can be pulled off axially to remove the hot runner nozzle from the nozzle body. In an advantageous manner, the locking device formed by the lock and the locking sleeve enables a compact designed hot runner nozzle in which all parts of the locking device are arranged tightly against the nozzle body in the radial direction, which saves space. Thus, the hot runner nozzle can also be installed where there are limited spaces in an injection mold form. In the process, the parts of the locking device located on the outside perimeter of the nozzle body are nonetheless still accessible. Based on the compact dimensions of the hot runner nozzle, only relatively small recesses need to be provided in the injection mold form to insert the hot runner nozzle. This keeps the bending resistance of the injection mold form high. The hot runner nozzle also enables a simple installation and removal, which is especially advantageous in performing maintenance work on the hot runner nozzle and/or the injection mold form.

In the clamped position, the abutting slant of one of the two parts (lock, sleeve) lies against the seating area of the other part (sleeve, lock), so that the two parts are locked against one another. Here, the angle between the abutting slant against the seating area or the seating position and the cylindrical shell of a cylinder arranged concentric to the longitudinal axis of the retainer and extending through the seating position is designed such that the lock in the clamped position is fastened self-locking at the perimeter of the sleeve. Between this cylindrical shell and the abutting slant, a wedge gap is formed in the seating area that transfers the rotating moment, which acts between the lock and the sleeve when rotating the lock from the released position into the clamped position, into a radial force component. This radial force component deflects the wall region of the retainer, which forms the seating area, toward the longitudinal centerline of the sleeve and against the restoration force of its material, and/or that of the lock material. In this manner, the inside of the deflected wall region of the sleeve is also pressed directly against the heating unit, or if necessary indirectly through at least one intermediate element located between the sleeve and the heating unit. At the side of the nozzle body opposite the seating area, the sleeve is supported from the inside at at least one other position of the heating unit and/or at the nozzle body so that the heating unit is clamped between the sleeve and the nozzle body. Therefore, the heating unit, which is flexible with respect to the clamping force, is pressed against the nozzle body or against an intermediate part, if necessary, provided between the nozzle body and the heating unit. In this way, a good transfer of the heat produced by the heating unit to the nozzle body and to the melt throughput channel that penetrates it is accomplished. The hot runner nozzle according to the invention enables a largely even heat transfer to the nozzle body, both over the length of the heating unit as well as around the perimeter of the heating unit. Since the nozzle body, the heating unit, the sleeve and the lock expand to approximately the same degree when heated, the clamping force applied by the sleeve onto the heating unit is largely independent of the temperature of the hot runner nozzle.

The wedge lock surface can be located on the inside of the lock and a protrusion can be provided, for example, on the outside of the sleeve produced by a cam, which is directly or indirectly fastened against the clamping surface of the lock or is locked with it in the clamped position by means of at least one intermediate part. Of course, the reverse arrangement is also possible, in which the wedge lock surface is located at the outside of the sleeve and the cam or the protrusion is located on the inside of the lock. However, it is also possible for wedge lock surfaces to be provided on the inside of the lock and on the outside of the sleeve, that are locked in the clamped position directly against one another or indirectly through at least one intermediate part.

It is advantageous if the sleeve is designed as a slitted sleeve with a continuous slit running along its axial length and open at the edge at its ends. In this way, an even reduction of the diameter of the sleeve is made possible during the locking process. The clamping force can then be transferred even more effectively onto the heating unit. It is effective if the sleeve consists of a material that elastically deforms when pressed with the clamping force. The slit runs preferably parallel to the longitudinal axis of the sleeve, but can also run at a slant to it and can, for example, be spirally designed.

In an especially advantageous embodiment of the invention, at least one of the surfaces of the sleeve and the lock that face one another have a number of areas, in particular three, that are offset from one another around the perimeter, each having a wedge lock surface. Also, in the clamped position these areas sit against a seat associated with each of the areas of the other part in a plane orthogonal to the longitudinal axis of the lock. The clamping forces can be transferred more evenly at a number of points arranged offset from one another around the perimeter, to the sleeve and to the heating unit and from this to the nozzle body. The heating unit is thus pressed very evenly against the nozzle body, which enables an even heat transfer to the nozzle body.

In an advantageous embodiment of the invention, it is provided that the lock is designed in circular or sleeve shape and has differing inside diameters at various places offset from one another around the perimeter, that the sleeve has different outside diameters at various places offset from one another around the perimeter, that the smallest inside diameter of the lock is larger than or equal to the smallest outside diameter of the sleeve and the largest inside diameter of the lock is larger than or equal to the largest outside diameter of the sleeve, and that the smallest inside diameter of the lock is smaller than the largest outside diameter of the sleeve. The locking device formed by the lock, the sleeve and the nozzle body then enables an especially even radial pressing of the heating unit.

It is advantageous if the lock is designed as a locking sleeve that extends preferably over the entire length of the sleeve. The heat released by the heating unit can then be transferred in the axial direction of the nozzle body especially evenly onto it.

It is effective if the lock has grip points to connect to an activation tool, wherein the grip points are designed preferably as recessed receptacles on the external perimeter of the lock. Then, an activation tool to turn the lock relative to the sleeve can be placed at the grip points of the lock, for example a spanner wrench or similar tool containing a lever arm.

It is effective if a rotation safety is located between the lock and the nozzle body. This can have, for example, at least one protrusion on the bottom end of the lock opposite the nozzle discharge opening of the nozzle body in the operational position. This protrusion engages into a recessed receptacle designed for it on the nozzle body in the operational position. Of course a reverse arrangement is also possible in which the protrusion is located at the nozzle body and the recessed receptacle is located at the sleeve. The rotation safety prevents the sleeve from turning along with the lock when it is turned between the released position and the clamped position.

It is advantageous if the sleeve and/or the lock are designed as a pressed sheet part and that, in particular, a ledge or a step is located between neighboring wall regions of the sleeve or lock around the perimeter, each having a wedge lock surface. In this way, the lock and/or sleeve can, for example, be designed as stamped part and/or a bent part. Here, the ledges or steps between the wall regions of the sleeve or lock having the wedge lock surfaces form stiffeners that enables even a comparatively thin-walled lock or sleeve to transfer relatively large clamping forces.

It is advantageous if the heating unit is fastened to the sleeve, in particular using at least one soldered connection. The sleeve can then be pulled out together with the heating unit axially from the nozzle body or pushed onto it when released. When the heating unit is removed from the nozzle body, it is also well protected in the sleeve against mechanical damage.

It is advantageous if the heating unit has an electrical heating coil and if the heating coil has a higher winding density preferably in the areas neighboring the axial ends of the nozzle body than in an area located between these areas. The heat transferred to the nozzle body by the heating coil at points along the axial direction of the nozzle offset from one another can then adjusted at the various points of the nozzle body so that along the throughput channel of the nozzle body, an approximately constant temperature distribution results.

In an advantageous embodiment form of the invention, an intermediate sleeve, preferably with a continuous slit in the axial direction, is located between the heating unit and the nozzle body, the sleeve being flexible in the radial direction. The heating unit is then located between the intermediate sleeve and the sleeve, wherein the intermediate sleeve and the sleeve can form a casing, if necessary, which encloses the heating unit. To attain a locally different heat transfer to the nozzle body, the intermediate sleeve can have at its exterior facing the heating unit in areas at least one radial recess at which the wall of the intermediate sleeve separates itself from the heating unit when the intermediate sleeve is in the clamped position. However, the intermediate sleeve can also have in areas at least one radial recess at its interior side that faces the nozzle body. At this recess, the wall of the intermediate sleeve is separated from the nozzle body or from another part located between the nozzle body and the intermediate sleeve when the intermediate sleeve is in the clamped position. These measures also result in a locally differing heat transfer to the nozzle body, even if the heating coil of the heating unit has a constant coil density in the axial direction of the intermediate sleeve.

BRIEF DESCRIPTION OF THE DRAWINGS

An embodiment example of the invention is explained in more detail below with the help of the illustrations. Shown are.

DETAILED DESCRIPTION OF THE PREFERRED EMBODIMENT

Figure 1:
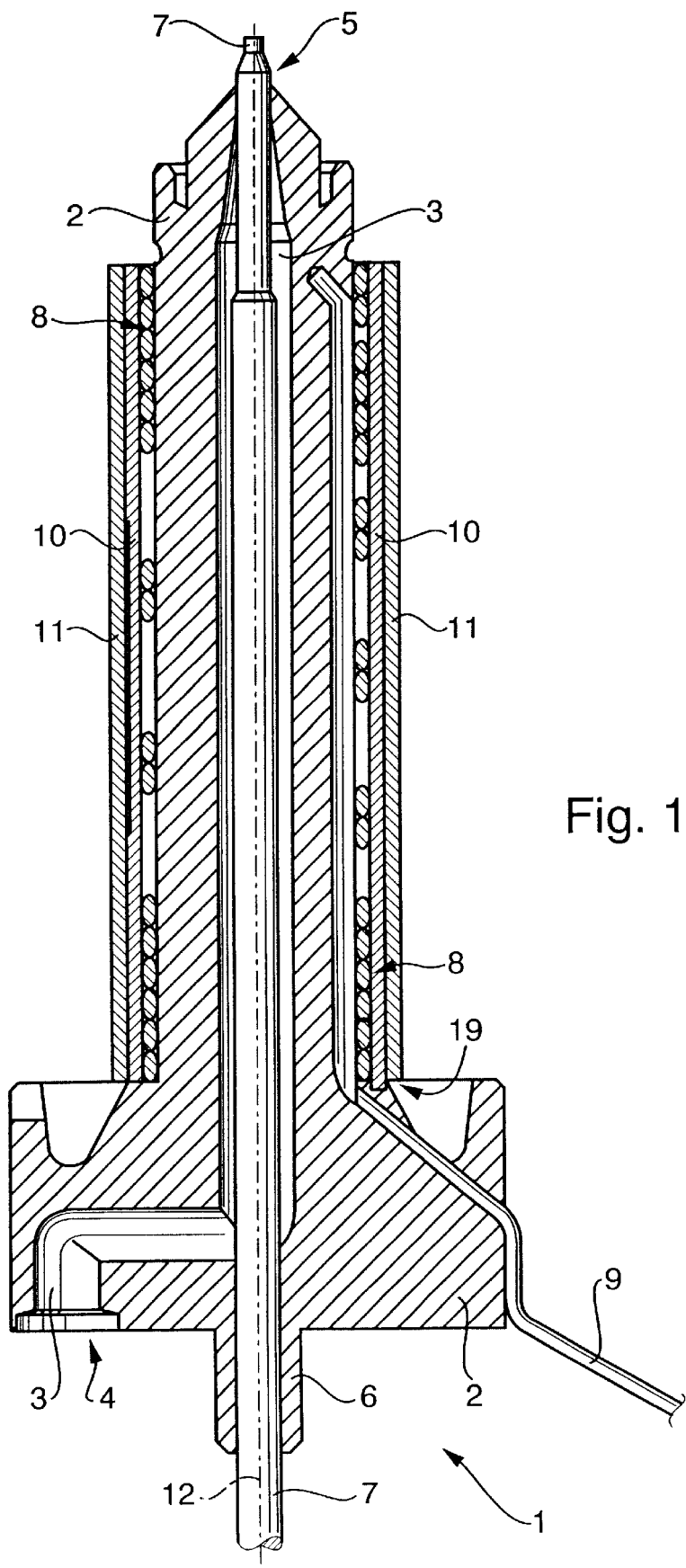
FIG. 1 a longitudinal section through the center plane of a hot runner nozzle.

A hot runner nozzle for injection molding identified in its entirety by 1 has a nozzle body 2 that has a melt throughput channel 3 penetrating its length. This throughput channel has a nozzle inlet 4 at one of the axial ends of the nozzle body 2 to feed melts into the interior of the nozzle body 2 and at the other axial end of the nozzle body 2 has a nozzle exit 5. The nozzle inlet 4 is connected in the operational position to a known feed unit for the melts, which can for example have a heated feed screw to feed the melt.

The nozzle body 2 has a needle guide designed as a bushing 6 in which a closing needle 7 is located and can shift axially. This closing needle engages into the throughput channel 3 and seals against the peripheral edge of the nozzle body 2 in the closed position at its free end. In the open position, the closing needle 7 is pulled back away from the nozzle exit 5 to discharge the melt at least in areas.

At the exterior perimeter of the nozzle body 2 is a jacket-heating unit 8 that has a heating coil that is run spirally around the exterior perimeter of the nozzle body 2. The heating coil has two heating wires running parallel to one another that are each connected at the end of the nozzle body 2 opposite the nozzle exit 5 to electrical connection lines 9 leading to a heating current source. At its exterior perimeter, the heating unit 8 is enclosed by a sleeve 10.

Figure 2:
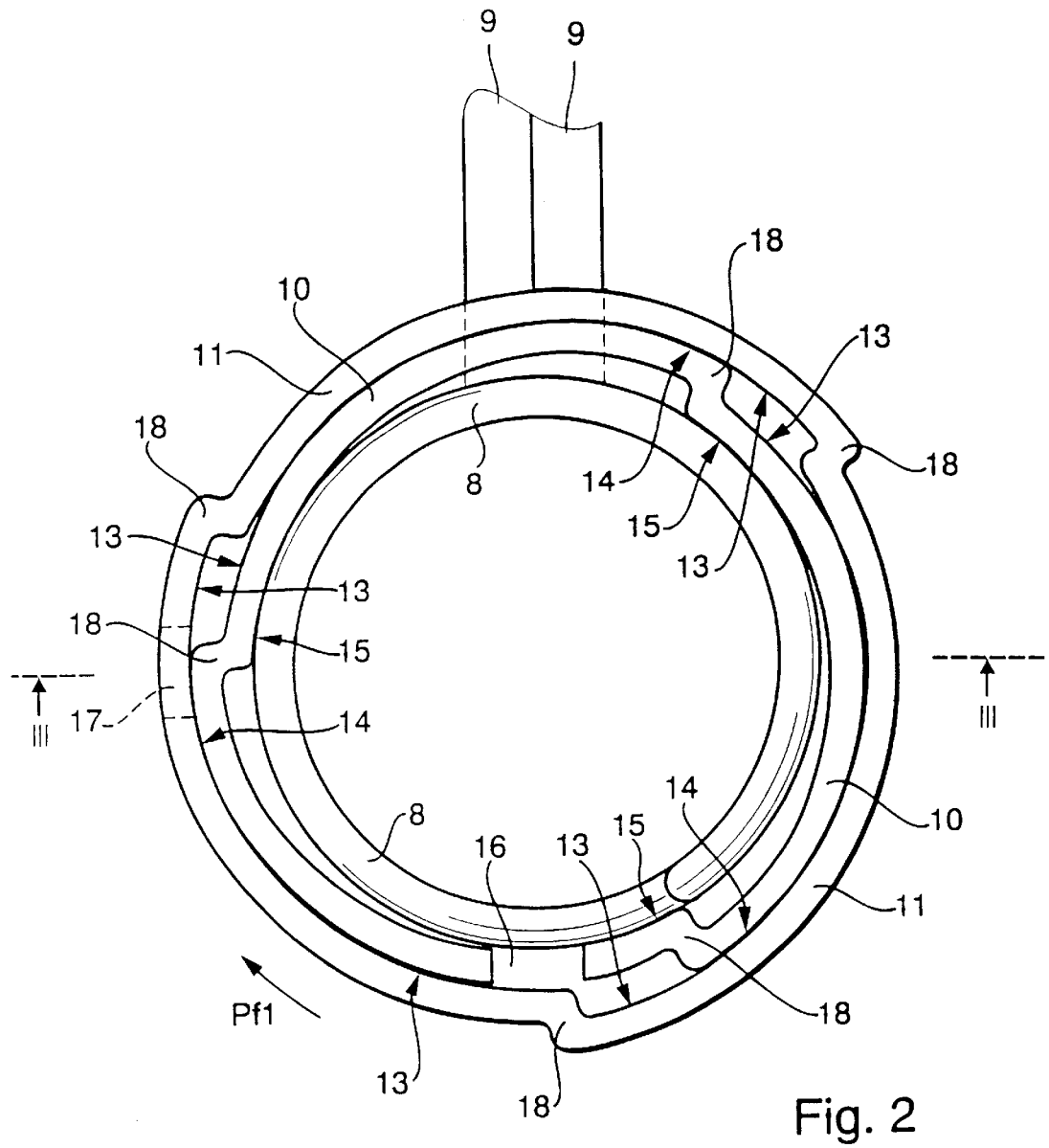
FIG. 2 a cross section through the heating element, the locking sleeve and the clamping sleeve of the hot runner nozzle shown in FIG. 1, wherein the receptacles for the activation tool are shown as dashed lines, and FIG. 3 a longitudinal section through the arrangement shown in FIG. 2 in the plane designated as III in FIG. 2.

The sleeve 10 is enclosed at its exterior perimeter by a lock 11 designed as a locking sleeve that can turn about its longitudinal axis 12 relative to the sleeve 10 between a released position and a clamped position. As most clearly shown by FIG. 2, the inner surface of lock 11 and the facing exterior surface of the sleeve 10 each have a profile that deviates from that of a cylindrical shell that is concentric to the longitudinal axis 12. In order to better illustrate the cooperation of these surfaces facing one another, the deviations of these surfaces from the cylindrical shell form are shown distorted and enlarged in FIG. 2. Here, it can be seen that the interior surface of lock 11 and the exterior surface of the sleeve 10 each have a number of areas offset from one another around the perimeter that are each designed as wedge lock surfaces 13. In FIG. 2, it can be clearly seen that the wedge lock surfaces 13 of parts 10 and 11 each have an abutting slant against which a wedge lock surface 13 of each of the other parts 13, 12 sits in the clamped position.

In FIG. 2, it can be seen that the wedge lock surfaces 13 each have a radius, or distance from the longitudinal axis 12, that is smaller at one of their ends along the perimeter than at their other end along the perimeter. Between these ends along the perimeter, the radius steadily increases along each of the wedge lock surfaces 13 around the perimeter, starting from the position with the smallest radius and going to the position with the largest radius. The smallest radius of the wedge lock surface 13 of the lock 11 is larger than or equal to the smallest radius of the sleeve 10 and the largest radius of the lock 11 is larger or equal to the largest radius of the sleeve 10. The smallest radius of the lock 11 is smaller than the largest radius of the sleeve 10.

As seen in FIG. 2, this effect clamps the sleeve 10 located in the interior space of the lock 11 when the lock 11 is turned in the direction of the arrow Pf1 relative to the fixed sleeve 10, located in the interior space of the lock 11. This deflects wall regions, located at the seating areas 14, of the sleeve 10, which is made of an elastic material that is flexible against the clamping force, approximately radially and moves them toward the heating unit 8. The sleeve 10 is supported on the inside by the exterior perimeter of the heating unit 8 that is radially flexible at a number of load points 15 that are offset from one another around the perimeter. In the clamped position of the lock 11, a part of the clamping force exerted by the lock 11 onto the sleeve 10 at the load points 15 is transferred as approximately radially acting pressure force onto the heating unit 8, the inside of which opposite the sleeve 10 is then pressed against the nozzle body 2. Here, pressure of this type imposed on the heating unit 8 is done at a number of load points 15 that are offset from one another around the perimeter. This results in a good thermally conducting connection between the heating unit 8 and the nozzle body 2. The heat generated by the heating unit 8 can thus be transferred to the nozzle body 2 and to the throughput channel 3 very evenly and with low losses. Otherwise, the heating unit 8, the sleeve 10 and the lock 11 are fixed to the nozzle body 2 in the clamped position.

In FIG. 2, it can be seen that the sleeve 10 has a continuous slit 16 in the axial direction over its entire length. This improves the deformation of the individual wall regions of the sleeve 10 caused by the clamping forces in the radial direction. The deformation opposes the restoration force of the sleeve material, moving the wall regions toward the heating unit 8.

Figure 3:
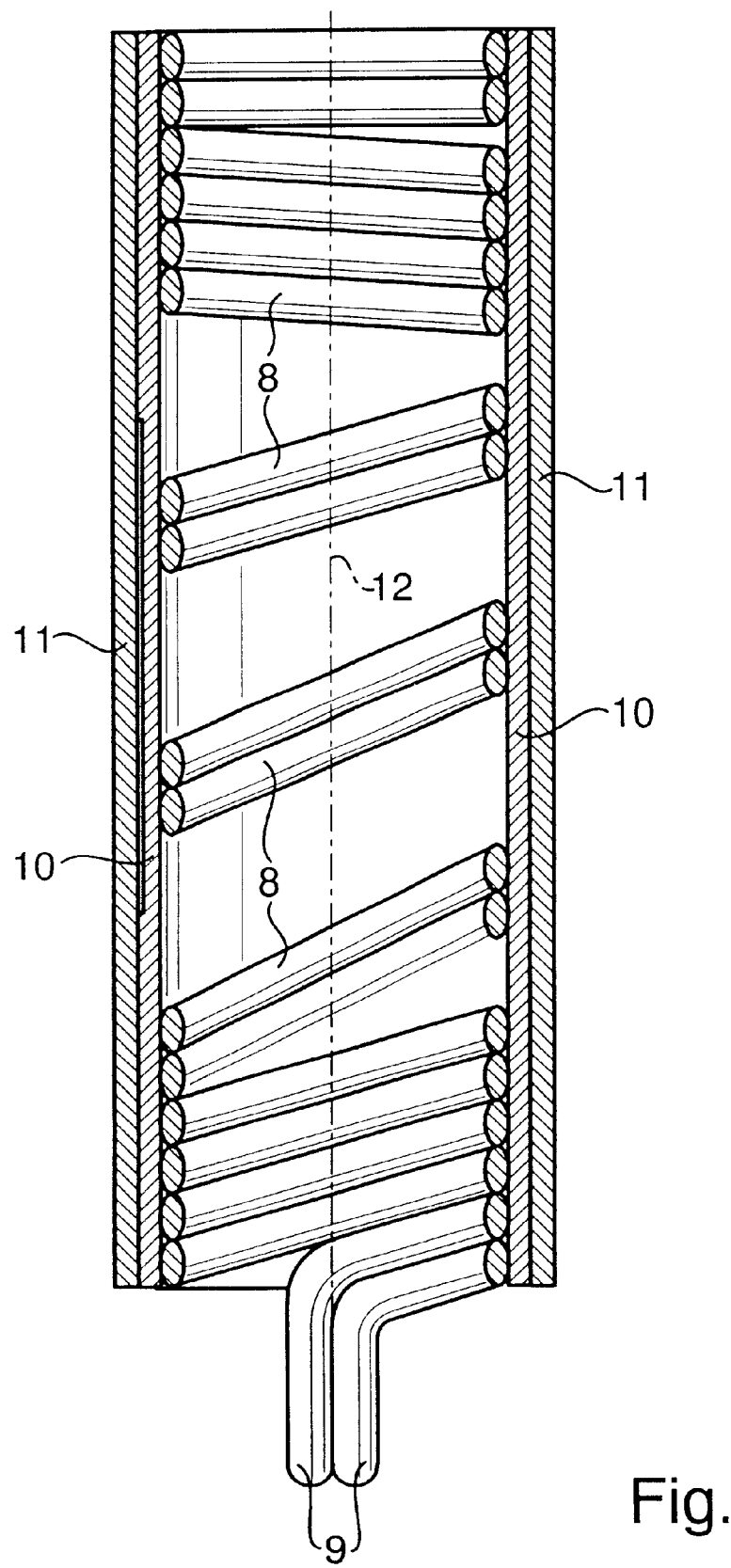

In FIGS. 1 and 3, it can be seen that the lock 11 and the sleeve 10 each extend over the entire length of the heating walls of the heating unit 8. This makes it possible to press all windings of the heating walls at the same time against the nozzle body 2 using the locking device formed by the lock 11 and the sleeve 10.

The lock 11 has grip locations 17 on its exterior for an activation tool, for example for a spanner wrench. The activation tool forms a lever arm in the operational position that enables better torquing of the lock 11 against the sleeve 10. The grip locations 17 are formed by recessed receptacles in the lock 11 or by wall penetrations of the lock 11. The activation tool can be attached to grip locations 17 both for fixing the lock 11 by rotating in the direction of the arrow Pfl, as well for releasing the lock 11 by rotating in the opposite direction. It should be mentioned that the incline or rise of the wedge lock surfaces 13 designed as a track can be chosen to correspond to the pressure force provided for the heating unit 8. In this manner, the angle of incline is dimensioned such that the locking element 11 that rotates with respect to the sleeve is fixed in the clamped position self-locking to the sleeve 10.

The sleeve 10 and the lock 11 are each designed as pressed sheet parts. Between adjacent wall regions of the sleeve 10 or lock 11 around the perimeter, each having a wedge lock surface 13, there is a ledge or step 18 that is produced by bending or beveling. The grip locations 17 for the activation tool are attached by stamping out a wall region in the lock 11.

The heating unit 8 has a heating coil with a heating line enclosed by an isolation material, for example a ceramic. The heating unit 8 is soldered to the sleeve 10. The solder locations are located one at each of the opposite axial ends of the heating unit. The heating unit 8 can then be axially removed from the nozzle body 2 together with the sleeve 10 in the released position of the lock 11. The heating unit 8 removed from the nozzle body 2 is protected in the sleeve 10 against mechanical damage.

In FIG. 1 and 3, it can be seen that the heating coil of the heating unit 8 has a different winding density at different positions offset from one another in the direction of the longitudinal axis 12. In this way, an approximately even temperature distribution is attained along the throughput channel 3.

In FIG. 1, it can be seen that a rotation safety 19 is located between the sleeve 10 and the nozzle body 2. This has a protrusion projecting in the axial direction at the bottom end of the sleeve 10 opposite the nozzle exit 5 in the operational position. This protrusion engages into a recessed receptacle of the nozzle body 2 that is intended for it.

In summary, a hot runner nozzle I for injection molding 15 provided that has a nozzle body 2 with a throughput channel 3 connected to a nozzle exit 5 for melts. At the exterior perimeter of the nozzle body 2 is at least one jacket-heating unit 8. This is enclosed at its external perimeter by a sleeve 10 that is flexible in the radial direction. The sleeve 10 is enclosed at its exterior perimeter by at least one circular lock 11 that rotates about its longitudinal axis 12 relative to the sleeve 10 between a released position and a clamped position. The surfaces of the sleeve 10 and the lock 11 facing one another each have a profile that deviates from that of a cylindrical shell that is concentric to the longitudinal axis 12. The surface of at least one of these parts, 10, 11, is at least in areas designed as a wedge lock surface 13, that has in the clamped position an abutting slant in a plane orthogonal to the longitudinal axis 12, against which a seating area of the surface of the other part 11, 10 lies.

What is claimed:

1. A hot runner nozzle (1) for injection molding comprising a nozzle body (2) having a nozzle exit (5) for melts, at an exterior perimeter of which at least one jacket-heating unit (8) to heat the nozzle body (2) is located, wherein the heating unit (8) is enclosed at an exterior perimeter thereof by a sleeve (10), and wherein the sleeve (10) and the heating unit (10) are flexible in a radial direction, characterized in that the sleeve (10) is enclosed at its exterior perimeter by at least one circular lock (11) that rotates about a longitudinal axis (12) relative to the sleeve (10) between a released position and a clamped position, the facing surfaces of the sleeve (10) and the lock (11) each have a profile deviating from that of a cylindrical shell located concentric to the longitudinal axis (12), and at least one of the facing surfaces includes at least in areas a wedge lock surface (13) that has an abutting slant against which a seating area (14) of the surface of the other part (10, 11) lies.

2. A hot runner nozzle (1) according to claim 1, characterized in that the sleeve (10) includes a slit (16) extending over its axial length and open at an edge at its ends.

3. A hot runner nozzle (1) according to claim 1, characterized in that at least one of the facing surfaces of the sleeve (10) and the lock (11) has a number of areas, in particular three, located offset from one another around the perimeter, each having a wedge lock surface (13), and that the areas lie against associated seating points for each area of the other part (10, 11).

4. A hot runner nozzle (1) according to claim 1, characterized in that the lock (11) is designed with circular or sleeve shape and has different diameters at different positions offset from one another around a perimeter of the lock, that the sleeve (10) has different external diameters at different positions offset from one another around a perimeter of the sleeve, a smallest inner diameter of the lock (11) being larger than or equal to a smallest exterior diameter of the sleeve (10) and a largest inner diameter of the lock (11) being larger than or equal to a largest external diameter of the sleeve (10), and the smallest inner diameter of the lock (11) is smaller than the largest exterior diameter of the sleeve (10).

5. A hot runner nozzle (1) according to claim 1, characterized in that the lock (11) is designed as a locking sleeve, and that the locking sleeve (11) extends preferably over an entire length of the sleeve (10).

6. A hot runner nozzle (1) according to claim 1, characterized in that the lock (11) has grip locations (17) to connect to an activation tool and that the grip locations (17) are designed preferably as recessed receptacles on an exterior perimeter of the lock.

7. A hot runner nozzle (1) according to claim 1, characterized in that a rotating safety (19) is located between the lock and the nozzle body (2).

8. A hot runner nozzle (1) according to claim 1, characterized in that the sleeve (10) and/or the lock (11) is designed as a pressed sheet part and that a ledge or step (18) is located between adjacent wall regions of the sleeve (10) or lock (11) that are located around the perimeter, each of which has a wedge lock surface (13).

9. A hot runner nozzle (1) according to claim 1, characterized in that the heating unit (8) is fastened to the sleeve (10) in particular by at least one solder point.

10. A hot runner nozzle (1) according to claim 1, characterized in that the heating unit (8) has an electrical heating coil and the heating coil has preferably a larger winding density in areas neighboring the axial ends of the nozzle body (2) than in an area located between the end areas.

11. A hot runner nozzle (1) according claim 1, characterized in that an intermediate sleeve is located between the heating unit (8) and the nozzle body (2) that is flexible in a radial direction and preferably has a continuous axial slit.

* * * * *